United States Patent [19]

Ouano

[11] Patent Number: 5,626,941
[45] Date of Patent: May 6, 1997

[54] THIN FILM MEDIA FOR VERY LOW FLYING HEIGHT/CONTACT RECORDING APPLICATION

[75] Inventor: Augustus C. Ouano, Shrewsbury, Mass.

[73] Assignee: Quantum Corporation, Milpitas, Calif.

[21] Appl. No.: 889,157

[22] Filed: May 27, 1992

[51] Int. Cl.$^6$ ............... B32B 3/10; B32B 9/00; B32B 17/06; G11B 5/66

[52] U.S. Cl. ............ 428/141; 428/408; 428/426; 428/432; 428/694 T; 428/694 TP; 428/694 ST; 428/694 SG; 428/695; 428/900; 428/694 TC; 428/694 TF; 428/694 TR

[58] Field of Search ............... 428/141, 432, 428/426, 694 T, 694 TP, 694 TC, 694 ST, 694 TF, 694 SG, 694 TR, 695, 900, 408

[56] References Cited

U.S. PATENT DOCUMENTS

| | | | |
|---|---|---|---|
| 5,119,258 | 6/1992 | Tsai | 360/135 |
| 5,131,977 | 7/1992 | Morizane | 156/646 |
| 5,169,703 | 12/1992 | Miyazaki | 428/141 |
| 5,198,073 | 3/1993 | Ishibashi | 156/659.1 |

*Primary Examiner*—Leszek Kiliman
*Attorney, Agent, or Firm*—David B. Harrison; Debra A. Chun

[57] ABSTRACT

A method of fabricating a thin film media onto a rigid substrate. The method includes texturing a pattern of depressions of uniform dimensions on a substrate surface leaving strain-free plateaus therebetween. A magnetic film, an overcoat, and a lubricant are deposited, respectively, to the substrate and the patterned depressions.

14 Claims, 6 Drawing Sheets

THIN FILM MEDIA FOR VERY LOW FLYING HEIGHT/CONTACT RECORDING APPLICATION

BACKGROUND OF THE INVENTION

This invention relates generally to the field of magnetic disk devices. Currently, the trend in magnetic disk devices is to store more data in less space. Typically, high density magnetic recording media devices are obtained by reducing the flying height of a read/write head with respect to the media surface.

Contact start stop (CSS) recording is one particular technique that uses a low flying read/write head to maximize density on a media. In CSS recording, the read/write head contacts the disk surface during starting and stopping. In between starting and stopping, the read/write head flies over the disk and is suspended in air by a slider facing the surface of the media. The high speed motion of the disk causes air to be carried along with it, and the contour of the slider gives rise to an aerodynamic flotation cushion providing a constant, controlled separation between the disk and the read/write head.

A major problem associated with CSS recording media is that "stiction" develops at the interface of the read/write head and the surface of the magnetic disk. Stiction is the combination of friction and "stickiness" at the magnetic media surface that causes the read/write head to adhere to the surface, making it harder for the head to initiate movement therefrom. Typically, stiction occurs when the magnetic media surface is too smooth. To overcome stiction, a large force needs to be applied to the read/write head to initiate movement from the surface. Stiction can become high enough to cause damage to the head, the media, and the head suspension, which cause the head to crash into the magnetic media.

Another problem associated with the CSS recording media is that its surface is very smooth. Although a smooth media surface permits the read/write head to fly closer to the media surface, it is not very durable because the amount of lubricant that can be retained is very little.

One way of preventing stiction and increasing the durability of the media surface is to mechanically texture or rough the disk with lubricated peaks and valleys. Thus, the read/write head can rest on the peaks during starting and stopping, thereby reducing the contact area between the head and media. By resting on the peaks, the amount of force necessary to initiate movement of the read/write head is considerably less.

The mechanically textured peaks and valleys are formed by pressing an abrasive (i.e., emery tape) against a rotating media. While this process has been used to prevent stiction, it does have serious drawbacks. One major problem is that this process cannot be controlled. Thus, there is a tendency for the mechanically textured peaks and valleys to be nonuniformly distributed and to have poor texture quality in terms of depth, width, and height. Another drawback is that nonuniform peaks are highly stressed and brittle. This increases the probability that a low flying read/write head will interact or collide with the peaks. The interaction causes wear on the media and debris to deposit on the read/write head. Debris disturbs the air flow and eventually, the read/write head becomes unstable and loses its ability to lift due to debris pile-up and crashes onto the media surface. Another problem is that the mechanically textured process, when applied to a glass substrate causes microcracks to occur at the surface.

Consequently, there is a need for an improved process for texturing a rigid magnetic thin film media to provide lower wear, reduced stiction, and debris generation for very low flying read/write heads.

SUMMARY OF THE INVENTION

The present invention provides a rigid thin film media for a very low flying read/write head that satisfies the aforementioned needs. In accordance with the present invention, a uniform pattern of depressions having uniform depth and width are formed on an upper surface of a rigid media substrate. Between the depressions are strain free planar plateaus of uniform height. The spacing between the series of depressions and the planar plateaus is uniform. A magnetic film layer, an overcoat layer and a lubricant layer are formed over the patterned media substrate, respectively. The vertical uniformity of the pattern results in a rigid thin film media having substantially improved tribological properties (i.e. reduced wear, stiction and debris), durability and electrical performance compared to the mechanically textured media.

The pattern may have a variety of shapes. For example, the pattern may have a fish net shape, or a nested chevron shape, or a concentric circle shape or a circumferential hole shape or a series of dots arranged in concentric circles. Each pattern, however, has dimensions (i.e., pitch, width and depth) that are uniform with respect to each other.

The patterned depressions with plateaus therebetween form a substantially planar surface which improves electrical performance by permitting a read/write head to fly at a reduced distance from the surface, thus increasing its capacity for high density recording. With the performance improvement provided by the present invention, it is expected that a read/write head can fly at heights less than three micro inches away from the surface with reliability.

Also, the patterns increase the durability of the media substrate by providing reduced contact area between the read/write head and the media, and increases the lubricant reservoir on the surface of the media. The more lubricant that the media substrate can hold the more durable it will be. In the present invention, the lubricant is entrapped in the patterned depressions and is prevented from spinning off as the disc is rotated.

Furthermore, the patterns have a geometry that is suitable for servo-control applications. Each of the patterns generate a frequency modulation signal as the read/write head passes over a particular data track and sector. The frequency modulation signals are detected by a sensor (i.e., a capacitance or an optical sensor) incorporated on the read/write head and are used to maintain the head in between the data tracks. For example, a read/write head travelling over two data tracks, detects each frequency modulation signal generated from the respective data tracks. If the head is not centered in between the data tracks, a differential frequency modulation signal is produced. A differential frequency modulation signal causes a servo motor to drive the read/write head towards the center of the data tracks. The read/write is moved towards the center of the tracks until there is no further differential frequency modulation signal being produced.

The patterns are preferably formed on the substrate by lithographic techniques. First, a photoresist is formed on a planar surface of the substrate. Then, a mask is placed over the photoresist and exposed to light. The exposed areas of the photoresist are washed away with a solvent. Then the exposed surface of the substrate is etched using a liquid etchant or a plasma to form a pattern of etched depressions in the planar surface. The remaining unexposed photoresist is dissolved, and the pattern substrate is cleaned thoroughly. A magnetic film and an overcoat are then sputtered over the patterned substrate. Then a liquid lubricant is deposited on top of the hard overcoat.

In accordance with another preferred embodiment of the present invention, there is provided a process for fabricating the thin film media onto the rigid substrate. First, a desired pattern is textured onto the substrate. Then a series of uniformly strain-free depressions having uniform depth are formed on an upper surface of the rigid substrate. Next, a magnetic film is deposited over the patterned depressions and the substrate. Then an overcoat and a lubricant are applied over the magnetic film, respectively.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE INVENTION

Figure 1:
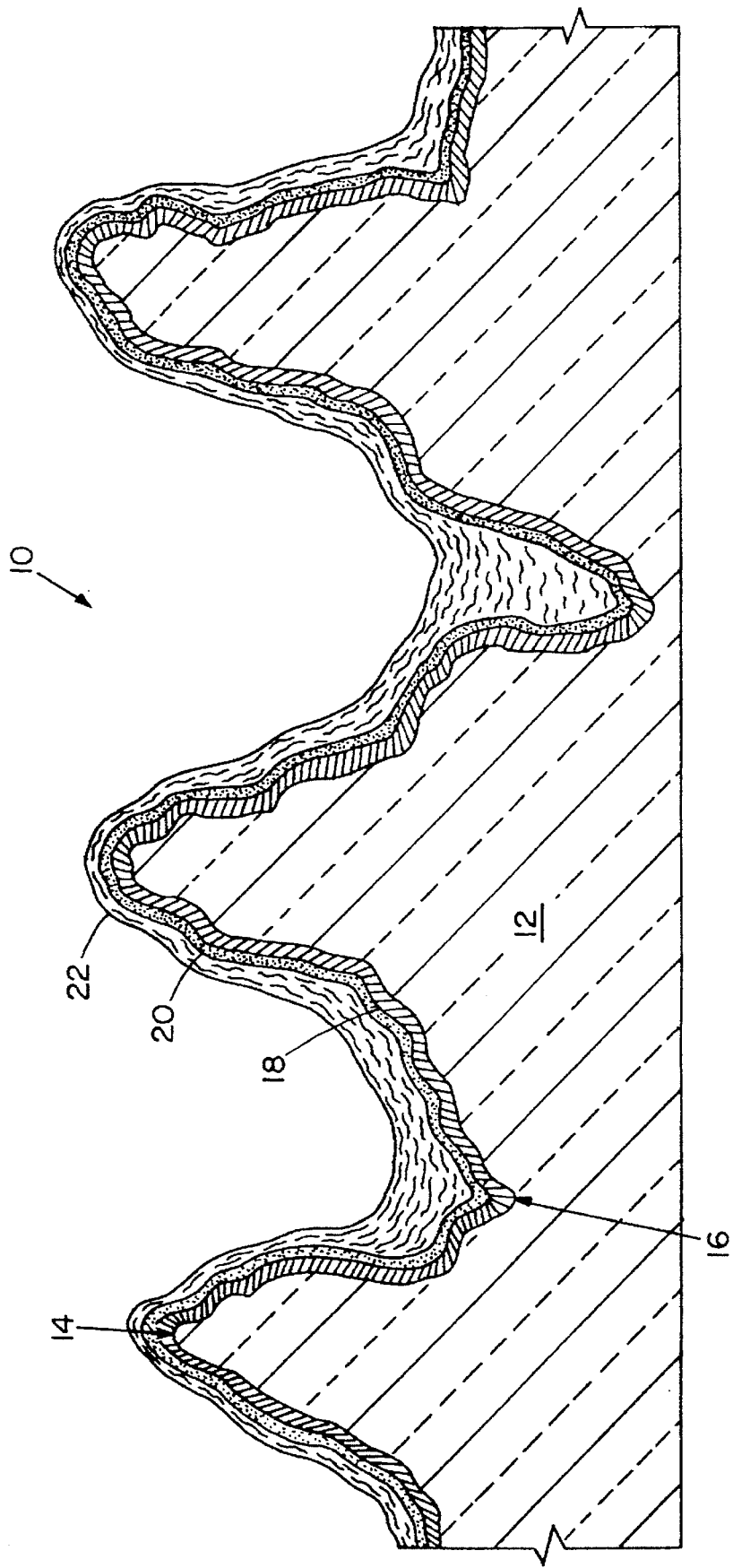
FIG. 1 shows a cross-sectional view of a mechanically textured media of the prior art.

FIG. 1 shows a cross-sectional view of a mechanically textured media 10 found in the prior art. The mechanically textured media 10 includes a substrate 12 with a plurality of peaks 14 and valleys 16 formed thereon. The peaks and valleys are distributed nonuniformly throughout the substrate and are of non-uniform vertical dimension. A magnetic film 18 is formed on the patterned substrate. Next, an overcoat 20 is formed on the magnetic film and then a lubricant 22 is applied to the overcoat.

Since the peaks 14 are mechanically made, they are highly stressed and therefore weak and brittle. Because of the non-uniform height, a low flying head has a high probability of interacting with the peaks. Eventually, over time the read/write head crashes or accelerates wear on the contact recording media.

Figure 2:
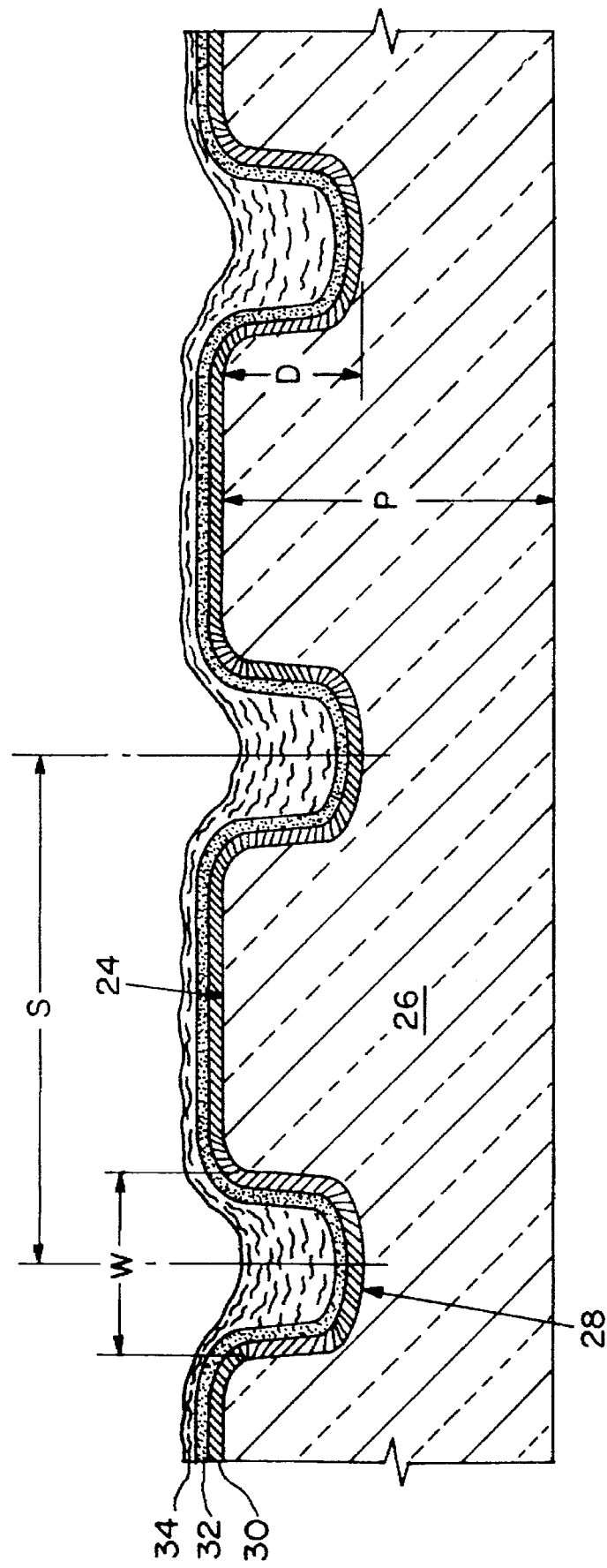
FIG. 2 shows a cross-sectional view of a lithographically textured media of the present invention.

Referring now to FIG. 2, there is shown a cross-sectional view of a textured media 24 of the present invention. The textured media 24 is formed of a substrate 26, in which a plurality of depressions 28 of uniform depth D and uniform width W are formed to provide a texture in a planar surface of the substrate. The depressions are separated by uniform spacings S therebetween. Left between the depressions are planar plateaus P that are of uniform height above each depression and are strain-free. A magnetic film 30 is formed over the textured substrate 26, an overcoat 32 is formed on the magnetic film and a lubricant 34 is formed over the overcoat.

As shown in FIG. 2, the depressions 28 are uniformly distributed throughout the substrate. Preferably, the depressions are spaced apart from each other at a distance S, which is about 2 microns to about 3 microns; the width W of each depression ranges from about 1 micron to about 2 microns; and the depth D of each depression ranges from about 0.01 micron to about 0.1 micron.

Figure 3A:
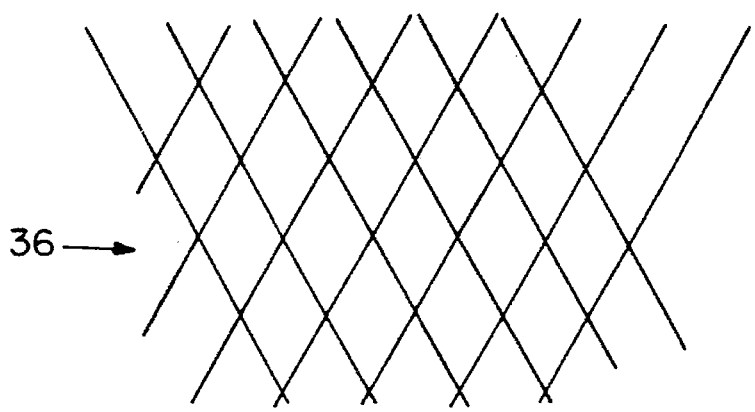
FIGS. 3a through 3d show a variety of patterns contemplated in the present invention.
Figure 3B:
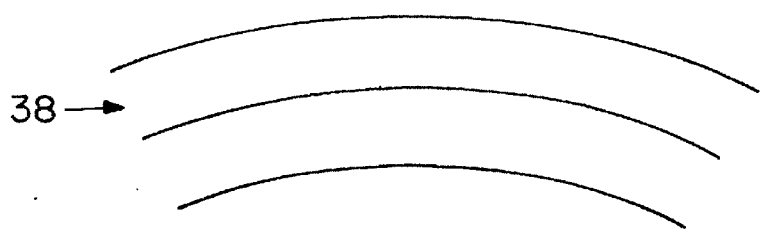
Figure 3C:
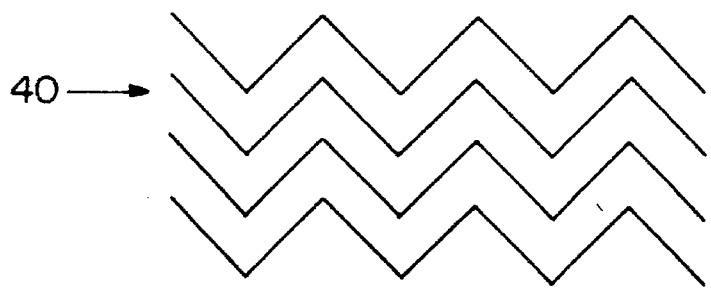
Figure 3D:
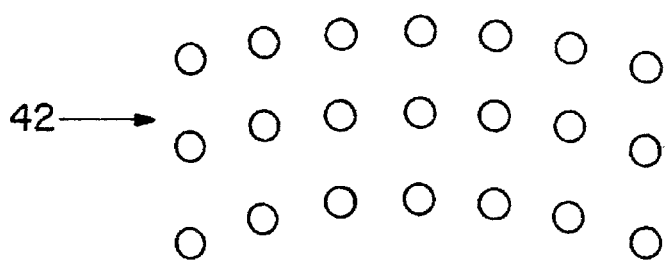

The depressions are formed in patterns as shown in FIGS. 3a through 3d. The patterns may have a variety of shapes. For example, FIG. 3a shows a fish net pattern 36; FIG. 3b shows a concentric circle pattern 38; FIG. 3c shows a herringbone or nested chevron pattern 40; and FIG. 3d shows a concentric hole or trench pattern 42. The above textured patterns are uniform in width, pitch and depth. Preferably, the width of each pattern ranges from less than 1 micron to about 2 microns, the pitch ranges from less than 2 microns to about 4 microns and the depth ranges from about 0.01 microns to about 0.10 microns.

Figure 4A:
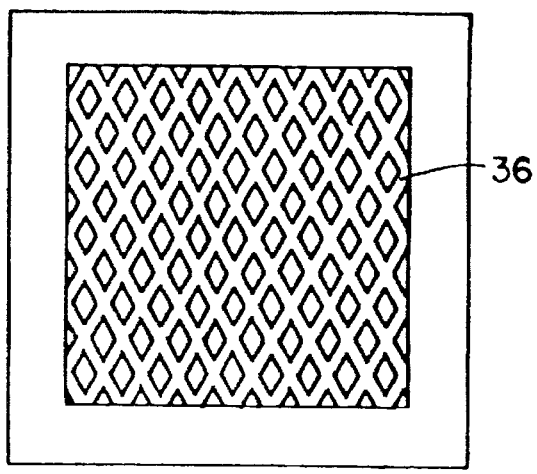
FIGS. 4 through 4A show an exploded top view of a pattern embodied on a disc.
Figure 4:
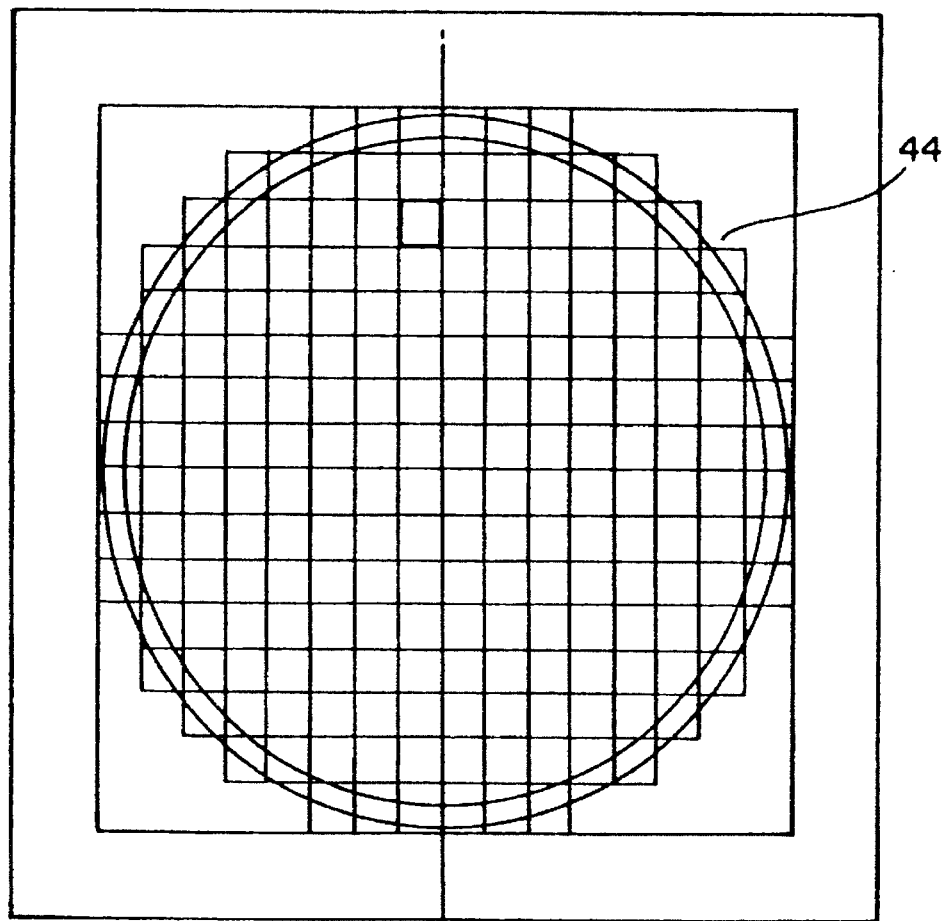

FIGS. 4 through 4A show an exploded top view of a fish net pattern 36 imposed onto a section of a media disc 44. The fish net pattern is placed on every section of the disc. Note that the fish net pattern is placed radially on the media directed towards the center of the disc. A radially placed pattern optimizes the electrical performance of the present invention, as discussed below.

The textured patterns of the uniformly distributed depressions result in a rigid thin film media having substantially improved tribological properties such as reduced wear, stiction, and debris generation. These characteristics provide a rigid thin film media that has greater durability than the randomly textured media shown in FIG. 1, because the non-uniform brittle peaks and valleys have been replaced with a series of uniformly distributed depressions with strain-free planar plateau surfaces therebetween.

Furthermore, the textured pattern improves the electrical performance of the read/write head, by permitting it to fly at a reduced distance from the surface of the magnetic thin film media. Thus, the capacity of the rigid thin film media 24 to record more data is maximized. A read/write head for the present invention can fly at separation distances less than three micro inches away from the surface of the thin film media. The preferred distance for the present invention is about two micro inches.

Figure 5:
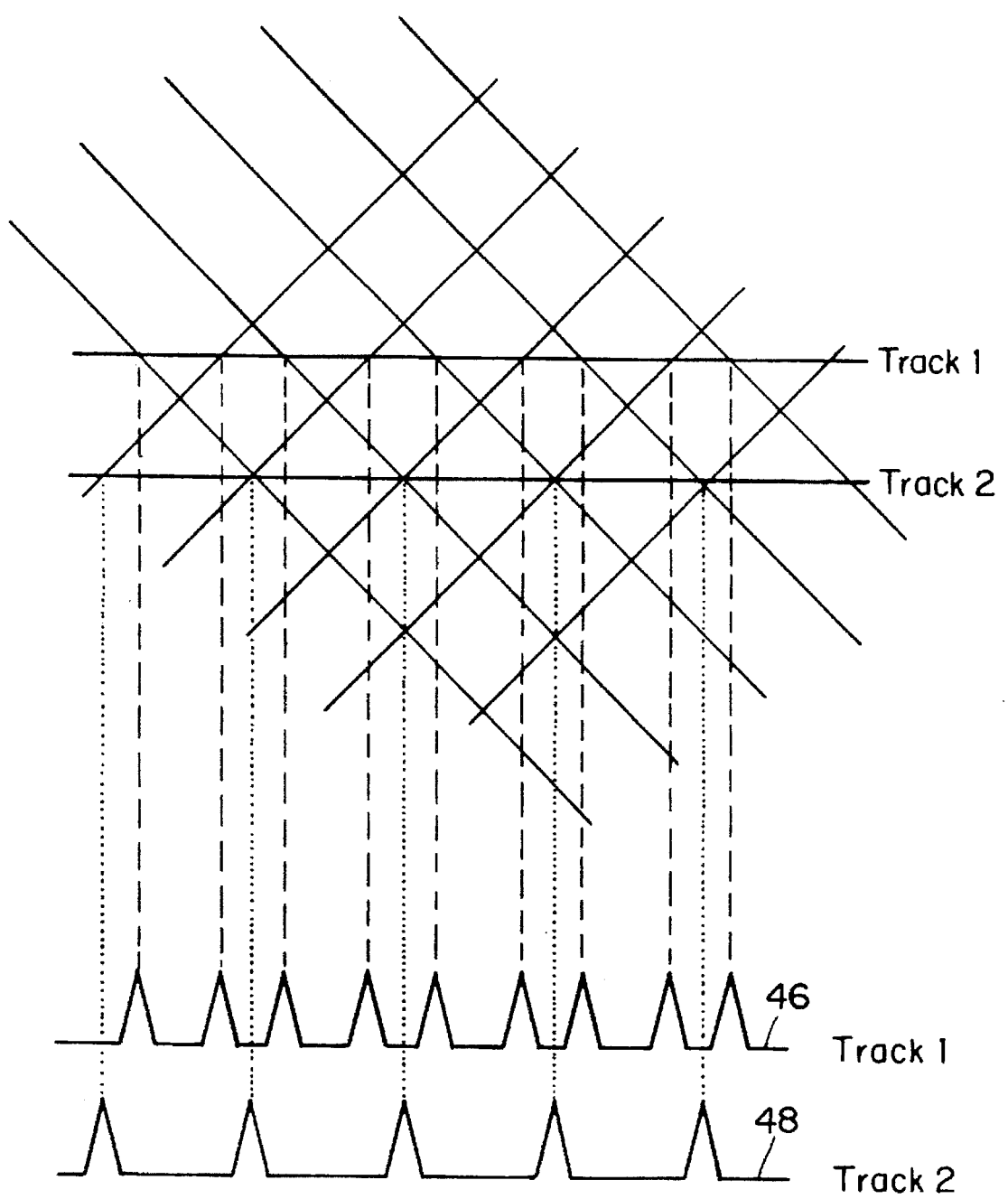
FIG. 5 shows a top view of a pattern embodied in the lithographically textured media with frequency modulation signals being generated therefrom.
Figure 6A:
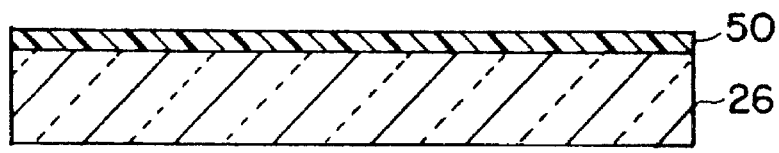
FIGS. 6a through 6e illustrate a method of fabricating the thin film media of the present invention.
Figure 6B:
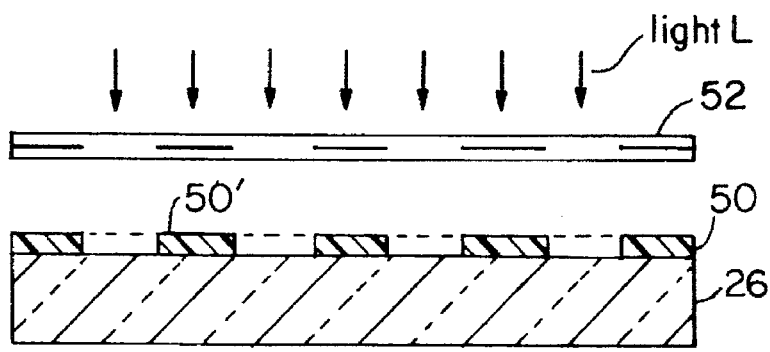
Figure 6C:
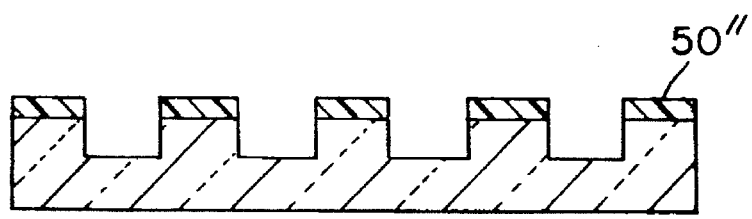
Figure 6D:
Figure 6E:
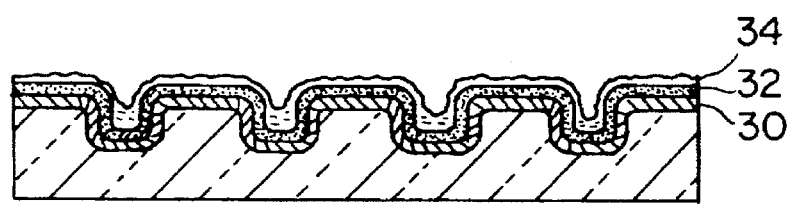

Another benefit of the textured patterns is that the present invention may be used as a servomechanism for controlling very small displacements. FIG. 5 shows a top view of a fish net pattern textured to the media in between two data tracks, track 1 and track 2. In a typical storage system, a read/write head is carried by a slider which is mounted to an actuator and a servo motor. The read/write head moves radially over the rigid thin film media so that any track on the media can be selected for use upon command.

In the view shown in FIG. 5, track 1 and track 2 each generate a frequency modulation signal 46 and 48 every time a read/write head travels over that particular area. Each of the frequency modulation signals 46 and 48 are detected by a capacitance or an optical sensor incorporated on the read/write head. If the read/write head is off center with regard to the two data tracks, a differential frequency modulation signal is generated by the sensor. The sensor sends the differential frequency modulation signals to the servo motor which drives the read/write head towards the center of tracks 1 and 2. The read/write head moves towards the center of the tracks until there is no further differential frequency modulation signal being produced. Thus, the read/write head can be maintained in between the data tracks.

The lithographically textured media 24 is formed in the manner illustrated in FIGS. 6a through 6e. The specific processing conditions and dimensions serve to illustrate the present method but can be varied depending upon the materials used and the desired application and device geometry. First, a hard polishable substrate 26, which may comprise glass, quartz, silicon carbide (i.e., a compound of silicon and carbon), alumina (i.e., an oxide of aluminum), or other suitable ceramic material is spray or spin coated with a photoresist 50 (see FIG. 6a). Then the photoresist and substrate are baked at a predetermined temperature usually between 90° C. to 100° C. to fix the resist. Next, a mask 52 having the desired pattern is disposed over the photoresist and the resist is exposed to light L (see FIG. 6b). The exposed areas photoresist are then washed away with a suitable solvent, such as a photoresist developer (i.e., a buffered KOH) (see FIG. 6c). The patterns formed by the mask (i.e., fish net, nested chevrons, concentric circles, circumferential holes) are etched onto the exposed areas by either a plasma etch ($CF_4$/Argon) or other suitable liquid etchants (i.e., hydrofluoric acid) leaving depressions of uniform depth (see FIG. 6d). Then the substrate is cleaned to remove the unexposed resist 50" leaving planar plateaus of uniform height between the depressions. Next, a magnetic thin film 30 is deposited on the patterned substrate. The magnetic film is preferably a mixture of alloys selected from the group comprising Cobalt, Chromium, Platinum, and Tantalum. After depositing the magnetic film 30, an overcoat layer 32, usually carbon is sputtered over the film (see FIG. 6e). The overcoat layer could also be formed of a mixture of carbon and hydrogen or carbon and nitrogen. Both the magnetic thin film 30 and overcoat layer 32 are preferably sputtered onto the substrate using conventional sputtering techniques. Next, a liquid lubricant 34 is applied over the overcoat layer 32. Then the thin film media is burnished to remove any bumps resulting from the sputtering techniques. The resulting structure is a thin film media having a rigid substrate patterned with strain-free depressions of uniform depth.

While the invention has been particularly and described in conjunction with a preferred embodiment thereof, it will be understood that many alternatives, modifications and variations will be apparent to those skilled in the art without departing from the spirit and scope of the invention as defined by the appended claims.

I claim:

1. A thin film media comprising:
    a substrate having a generally planar major surface, the surface having a predetermined pattern of depressions formed thereon, the depressions being defined by plateaus of uniform height therebetween, the predetermined pattern of depressions generating a frequency modulated tracking servo signal in an adjacent, relatively moving transducer for positioning a read/write head over a track during use of the media, wherein the predetermined pattern is a series of fishnets; and
    a magnetic film deposited uniformly over the major surface and in a conforming contact relationship over the major surface.

2. A thin film media according to claim 1, wherein the plateaus are strain-free.

3. A thin film media according to claim 1, further comprising an overcoat deposited over the magnetic film.

4. A thin film media according to claim 1, wherein the substrate is composed of a material selected from the group consisting of silicon, carbon, and aluminum.

5. A thin film media according to claim 3, wherein the overcoat comprises carbon.

6. A thin film media according to claim 3, further comprising a lubricant applied over the overcoat.

7. A thin film media, comprising:
    a substrate having a generally planar major surface, the surface having a predetermined pattern of depressions formed thereon, the depressions being defined by plateaus of uniform height therebetween, the predetermined pattern of depressions generating a frequency modulated tracking servo signal in an adjacent, relatively moving transducer for positioning a read/write head over a track during use of the media, wherein the predetermined pattern is a series of concentric circles; and
    a magnetic film deposited uniformly over the major surface and in a conforming contact relationship over the major surface.

8. A magnetic thin film media according to claim 7, wherein each of the depressions are of uniform depth and width.

9. A magnetic thin film media according to claim 7, wherein the substrate is a rigid disk.

10. A magnetic thin film media according to claim 9, wherein the substrate is composed of a material selected from the group consisting of silicon, carbon, and aluminum.

11. A thin film magnetic data storage medium for use with a read/write head, the medium comprising:
    a rigid substrate having a generally planar major surface, the major surface defining a predetermined pattern of depressions between plateaus of uniform height;
    a magnetic film formed on the rigid substrate in conformal contact with the major surface and following the predetermined pattern of depressions in the rigid substrate for generating modulation signals in the head; and
    wherein the predetermined pattern is a series of fishnets.

12. A thin film magnetic data storage medium for use with a read/write head, the medium comprising:
    a rigid substrate having a generally planar major surface, the major surface defining a predetermined pattern of depressions between plateaus of uniform height;
    a magnetic film formed on the rigid substrate in conformal contact with the major surface and following the predetermined pattern of depressions in the rigid substrate for generating modulation signals in the head; and
    wherein the predetermined pattern is a series of concentric circles about a rotational axis of the media.

13. A thin film magnetic data storage medium for use with a read/write head, the medium comprising:
    a rigid substrate having a generally planar major surface, the major surface defining a predetermined pattern of depressions between plateaus of uniform height;
    a magnetic film formed on the rigid substrate in conformal contact with the major surface and following the predetermined pattern of depressions in the rigid substrate for generating modulation signals in the head; and
    wherein the predetermined pattern is a series of nested chevrons.

14. A thin film magnetic data storage medium for use with a read/write head, comprising:
    a rigid substrate having a generally planar major surface, the major surface defining a predetermined pattern of depressions between plateaus of uniform height;
    a magnetic film formed on the rigid substrate in conformal contact with the major surface and following the predetermined pattern of depressions in the rigid substrate for generating modulation signals in the head; and
    wherein the predetermined pattern is a series of dots arranged in concentric circles about a rotational axis of the media.

* * * * *